(12) United States Patent
Mukherjee et al.

(10) Patent No.: US 10,789,404 B1
(45) Date of Patent: Sep. 29, 2020

(54) SYSTEM, METHOD, AND COMPUTER PROGRAM PRODUCT FOR GENERATING A FORMAL VERIFICATION MODEL

(71) Applicant: Cadence Design Systems, Inc., San Jose, CA (US)

(72) Inventors: Rajdeep Mukherjee, San Jose, CA (US); Benjamin Meng-Ching Chen, Los Altos, CA (US); Habeeb Farah, Nazareth (IL); Ziyad Hanna, Haifa (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/434,129

(22) Filed: Jun. 6, 2019

(51) Int. Cl.
| | | |
|---|---|---|
| *G06F 17/50* | (2006.01) | |
| *G06F 30/33* | (2020.01) | |
| *G06F 30/3323* | (2020.01) | |
| *G06F 30/327* | (2020.01) | |
| *G06F 30/31* | (2020.01) | |
| *G06F 30/323* | (2020.01) | |
| *G06F 30/30* | (2020.01) | |
| *G06F 111/02* | (2020.01) | |
| *G06F 119/16* | (2020.01) | |

(52) U.S. Cl.
CPC ............ *G06F 30/33* (2020.01); *G06F 30/327* (2020.01); *G06F 30/3323* (2020.01); *G06F 30/30* (2020.01); *G06F 30/31* (2020.01); *G06F 30/323* (2020.01); *G06F 2111/02* (2020.01); *G06F 2119/16* (2020.01)

(58) Field of Classification Search
None
See application file for complete search history.

(56) References Cited

U.S. PATENT DOCUMENTS

| 5,537,580 A | * | 7/1996 | Giomi | ............... | G06F 30/30 716/55 |
| 7,743,352 B2 | * | 6/2010 | Ganai | ............... | G06F 30/3323 716/106 |

OTHER PUBLICATIONS

I. Sander et al., "Transformation Based Communication and Clock Domain Refinement for System Design," ACM/DAC 2002, pp. 281-286. (Year: 2002).*
T. Raudvere et al., "Verification of Design Decisions in ForSyDe," CODES+ISSS'03, 2003 ACM, pp. 176-181. (Year: 2003).*
Z. Liu et al., "Semantic Consistency Checking for Model Transformations," 2010 2nd Int'l Conference on Computer Engineering and Technology, vol. 6, pp. 364-368. (Year: 2010).*
P. Herber, "The Rescue Approach—Towards Compositional Hardware/Software Co-Verification," 2014 IEEE Computer Society, pp. 721-724. (Year: 2014).*

* cited by examiner

*Primary Examiner* — Leigh M Garbowski
(74) *Attorney, Agent, or Firm* — Mark H. Whittenberger, Esq.; Holland & Knight LLP

(57) ABSTRACT

The present disclosure relates to a method for use in a formal verification of an electronic design. Embodiments may include receiving, using a processor, a specification model associated with an electronic design and generating, using a parser, an intermediate representation based upon, at least in part, the specification model. Embodiments may also include applying a machine generated semantic preserving program transformation to the intermediate representation to create a semantically transformed specification model and synthesizing the semantically transformed specification model to generate a formal verification model.

20 Claims, 10 Drawing Sheets

200

```
┌─────────────────────────────────────────────────────────────┐
│ receiving, using a processor, a specification model         │
│ associated with an electronic design                        │
└─────────────────────────────────────────────────────────────┘
202

┌─────────────────────────────────────────────────────────────┐
│ generating, using a parser, an intermediate representation  │
│ based upon, at least in part, the specification model       │
└─────────────────────────────────────────────────────────────┘
204

┌─────────────────────────────────────────────────────────────┐
│ applying a machine generated semantic preserving program    │
│ transformation to the intermediate representation to create │
│ a semantically transformed specification model              │
└─────────────────────────────────────────────────────────────┘
206

┌─────────────────────────────────────────────────────────────┐
│ synthesizing the semantically transformed specification     │
│ model to generate a formal verification model               │
└─────────────────────────────────────────────────────────────┘
208
```

FIG. 2

```
include <new> template <class T>
class MyNumber {
public:
    MyNumber(const T& val) {
        m_val = val;
    }
    T operator+(const MyNumber<T>& v) {
        return m_val + v.m_val;
    } private:
    T m_val;
};

int main ()
{
    int a, b;
    RTL_INPUT(int, a);
    RTL_INPUT(int, b);

unsigned char bufA[8];
    unsigned char bufB[8];
    MyNumber<int>* ma = new(bufA)MyNumber<int>(a);
    MyNumber<int>* mb = new(bufB)MyNumber<int>(b);

const int c = (*ma) + (*mb);

RTL_OUTPUT(int, c);
    return c;
}
```

```
struct _Z8MyNumberIiE {
    int m_val;
};

void _ZN8MyNumberIiEC1ERKi( struct _Z8MyNumberIiE *const thisptr, const int *__37_23_val) {
    (thisptr->m_val) = (*__37_23_val);
} int _ZN8MyNumberIiEpIERKS0_( struct _Z8MyNumberIiE *const thisptr, const struct _Z8MyNumberIiE *__40_36_v) {
    return (thisptr->m_val) + (__40_36_v->m_val);
} int main(void)
{ auto int __49_9_a; auto int __49_12_b;
  auto unsigned char __52_19_bufA[8];
  auto unsigned char __53_19_bufB[8];
  auto struct _Z8MyNumberIiE *__54_20_ma;
  auto struct _Z8MyNumberIiE *__55_20_mb;
  auto int __56_15_c;
  { auto int __50_5_      RTL_INPUT   __a;  __49_9_a = __50_5_    RTL_INPUT __a; };
  { auto int __51_5_      RTL_INPUT   __b;  __49_12_b = __51_5_   RTL_INPUT __b; };

__54_20_ma = ((struct _Z8MyNumberIiE *)(__T24960376 = ((void *)(__52_19_bufA))...
  __55_20_mb = ((struct _Z8MyNumberIiE *)(__T24960376 = ((void *)(__53_19_bufB))...

__56_15_c = (_ZN8MyNumberIiEpIERKS0_(__54_20_ma, __55_20_mb));
  { auto int __57_5_      RTL_OUTPUT __c;  __57_5_    RTL_OUTPUT __c = __56_15_c; };
};
return __56_15_c;
}
```

FIG. 9

FIG. 10

SYSTEM, METHOD, AND COMPUTER PROGRAM PRODUCT FOR GENERATING A FORMAL VERIFICATION MODEL

FIELD OF THE INVENTION

The present disclosure relates to electronic design verification, and more specifically, to a method for generating a formal verification model.

DISCUSSION OF THE RELATED ART

Formal verification relies upon a system of constraints to communicate the legal state space to the proof engines. Conventional technologies are limited in their ability to synthesize software specifications written using advanced language features, which consequently reduces their scope for usability in designs that are continuously evolving. The main reason for the language coverage problem is due to the frequent enhancements of the language standards such as $C^{++}$ or SystemC, as well as, availability of new standard libraries. Developers of the software specification use these modern language features to implement various functionalities while the design evolves over time.

In conventional techniques, the formal verification model generated from the software specification is targeted for equivalence checking only and not assertion-based verification. The main cause of this usability problem is that the verification model generated from the software specification is tightly integrated with the implementation model in the conventional equivalence checking flow, hence the synthesized verification model cannot be formally verified in standalone manner.

SUMMARY OF DISCLOSURE

In one or more embodiments of the present disclosure, a computer-implemented method for use in a formal verification of an electronic design. The method may include receiving, using a processor, a specification model associated with an electronic design and generating, using a parser, an intermediate representation based upon, at least in part, the specification model. The method may also include applying a machine generated semantic preserving program transformation to the intermediate representation to create a semantically transformed specification model and synthesizing the semantically transformed specification model to generate a formal verification model.

One or more of the following features may be included. In some embodiments, the method may include applying symbolic execution to the semantically transformed specification model to generate the formal verification model. Generating the intermediate representation may be based upon, at least in part, one or more external custom libraries. The method may also include providing the formal verification model and a property to a verifier. The method may further include providing the formal verification model to an invariant generator and generating one or more invariants at the invariant generator. The semantically transformed specification model may be functionally equivalent to the formal verification model.

In one or more embodiments of the present disclosure a computer-readable storage medium having stored thereon instructions, which when executed by a processor result in one or more operations is provided. Operations may include receiving, using a processor, a specification model associated with an electronic design and generating, using a parser, an intermediate representation based upon, at least in part, the specification model. Operations may also include applying a machine generated semantic preserving program transformation to the intermediate representation to create a semantically transformed specification model and synthesizing the semantically transformed specification model to generate a formal verification model. Operations may further include utilizing the formal verification model for at least one of equivalence checking or assertion-based verification of the specification model One or more of the following features may be included. In some embodiments, the method may include applying symbolic execution to the semantically transformed specification model to generate the formal verification model. Generating the intermediate representation may be based upon, at least in part, one or more external custom libraries. Operations may also include providing the formal verification model and a property to a verifier. Operations may further include providing the formal verification model to an invariant generator and generating one or more invariants at the invariant generator. The semantically transformed specification model may be functionally equivalent to the formal verification model.

In one or more embodiments of the present disclosure, a system for electronic design verification is provided. The system may include one or more processors configured to receive a specification model associated with an electronic design and generate, using a parser, an intermediate representation based upon, at least in part, the specification model. The at least one processor may be further configured to apply a machine generated semantic preserving program transformation to the intermediate representation to create a semantically transformed specification model. The at least one processor may be further configured to synthesize the semantically transformed specification model to generate a formal verification model.

One or more of the following features may be included. In some embodiments, the at least one processor may be further configured to apply symbolic execution to the semantically transformed specification model to generate the formal verification model. The at least one processor may be configured to generate the intermediate representation is based upon, at least in part, one or more external custom libraries. The at least one processor may be further configured to provide the formal verification model and a property to a verifier. The at least one processor may be further configured to provide the formal verification model to an invariant generator. The at least one processor may be further configured to generate one or more invariants at the invariant generator.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flowchart depicting operations consistent with the verification process in accordance with an embodiment of the present disclosure;

FIG. 9 is an example showing machine generated semantic preserving transformation from C++ to C; and FIG. 10 is an example showing the synthesis of lowered C to RTL.

DETAILED DESCRIPTION

Figure 1:
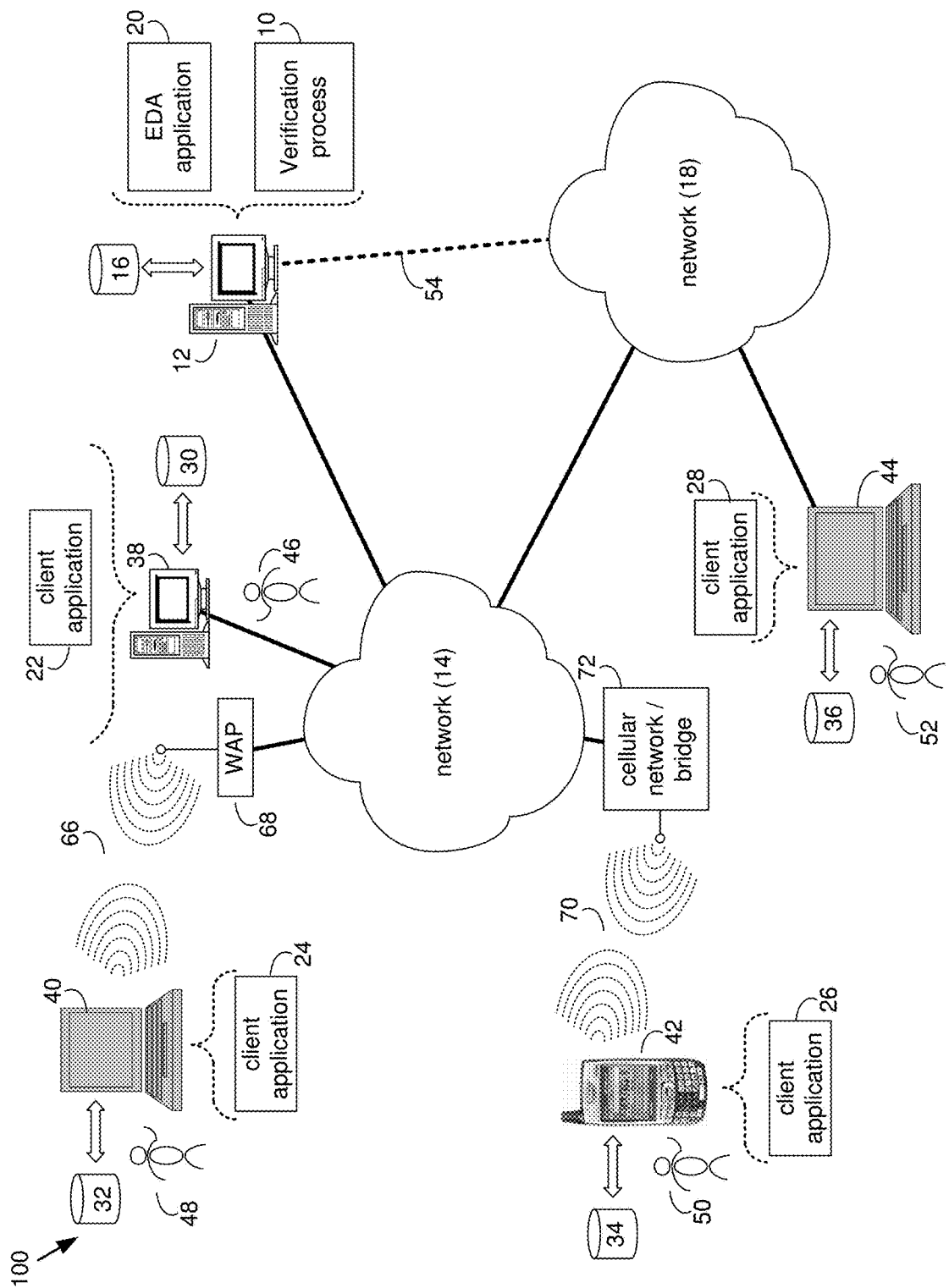
FIG. 1 is a diagram depicting an embodiment of a system in accordance with the present disclosure.

Embodiments of the present disclosure present an automatic technique for generating a formal verification model from a software specification for equivalence checking against an implementation model. As is discussed in further detail below, embodiments may utilize a semantic transformation-based synthesis technology for improved language coverage.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Referring now to FIG. 2, an exemplary flowchart 200 depicting operations for use in accordance with verification process 10 is provided. Embodiments may include receiving (202), using a processor, a specification model associated with an electronic design and generating (204), using a parser, an intermediate representation based upon, at least in part, the specification model. Embodiments may also include applying (206) a machine-generated semantic preserving program transformation to the intermediate representation to create a semantically transformed specification model and synthesizing (208) the semantically transformed specification model to generate a formal verification model.

In some embodiments, verification process 10 presents an automatic technique for generating a formal verification model from a software specification for equivalence checking against an implementation model. Verification process 10 may employ a semantic transformation-based synthesis technology for improved language coverage.

Figure 3:
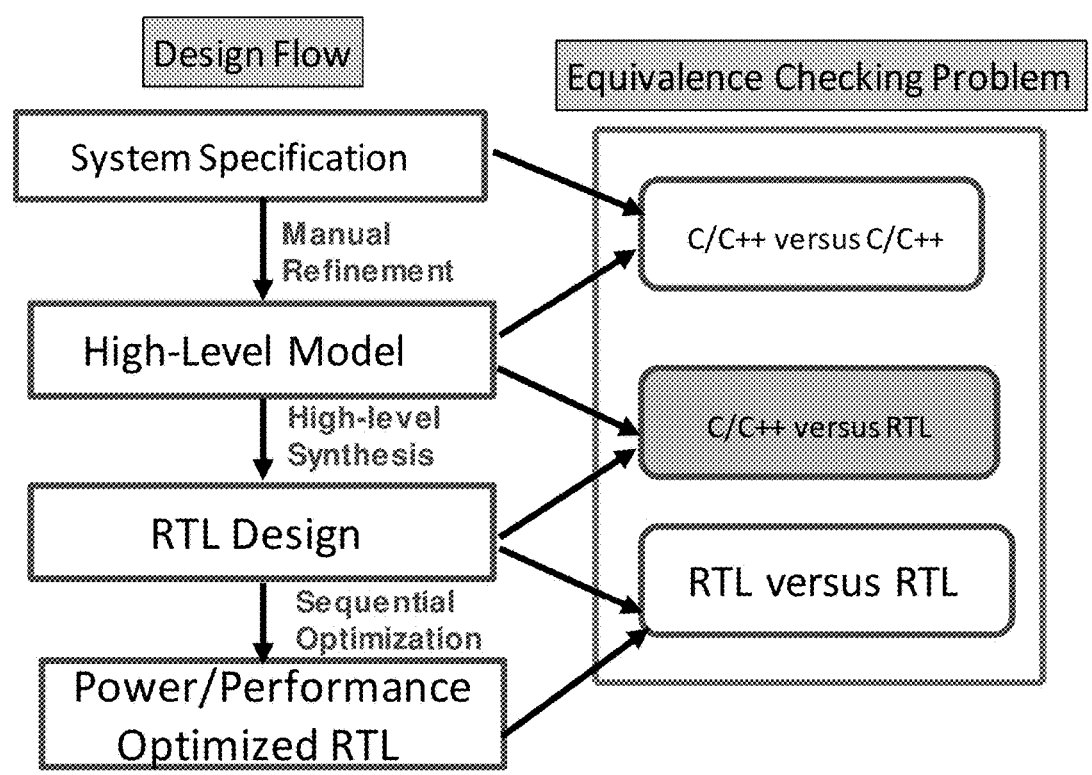
FIG. 3 is a diagram showing an equivalence checking problem in accordance with an embodiment of the present disclosure.

Referring now to FIG. 3, an embodiment depicting an example of an equivalence checking problem is provided. In equivalence checking, it may be necessary to determine how the inputs of both designs must be stimulated and how their outputs must be compared. Broadly, equivalence checking can be classified into two types—combinational equivalence and sequential equivalence. A combinational equivalence checking is used to check equivalence between two combinational designs that requires one-to-one mapping between the state elements. Whereas, for designs that contain sequential optimizations such as retiming, power-performance optimizations, there is no one-to-one mapping between the state elements. Sequential equivalence checking is used to check the validity of the sequential synthesis in a typical design flow. A typical design and verification flow is shown in FIG. 3, where a system specification may be received and through manual refinement a high-level model may be generated (both system specification and high-level model may be represented using programming languages such as C/C++/SystemC). High-level synthesis may be performed to create a hardware design typically represented at Register Transfer Level (RTL). The equivalence checking between a high-level model and an RTL design is a difficult problem. The complexity of equivalence checking at this level of design flow may be attributed to the structural mismatches of the data-path logic and control-logic (e.g., serial versus parallel implementation), timing differences between the models (e.g., untimed versus timed model), language non-determinism of the specification model, PPA-optimizations of the implementation model, etc. Subsequently, a power/performance optimized RTL may be generated through sequential optimization from the initial RTL model in the design flow which may be checked for equivalence using RTL versus RTL equivalence checking solutions.

Figure 4:
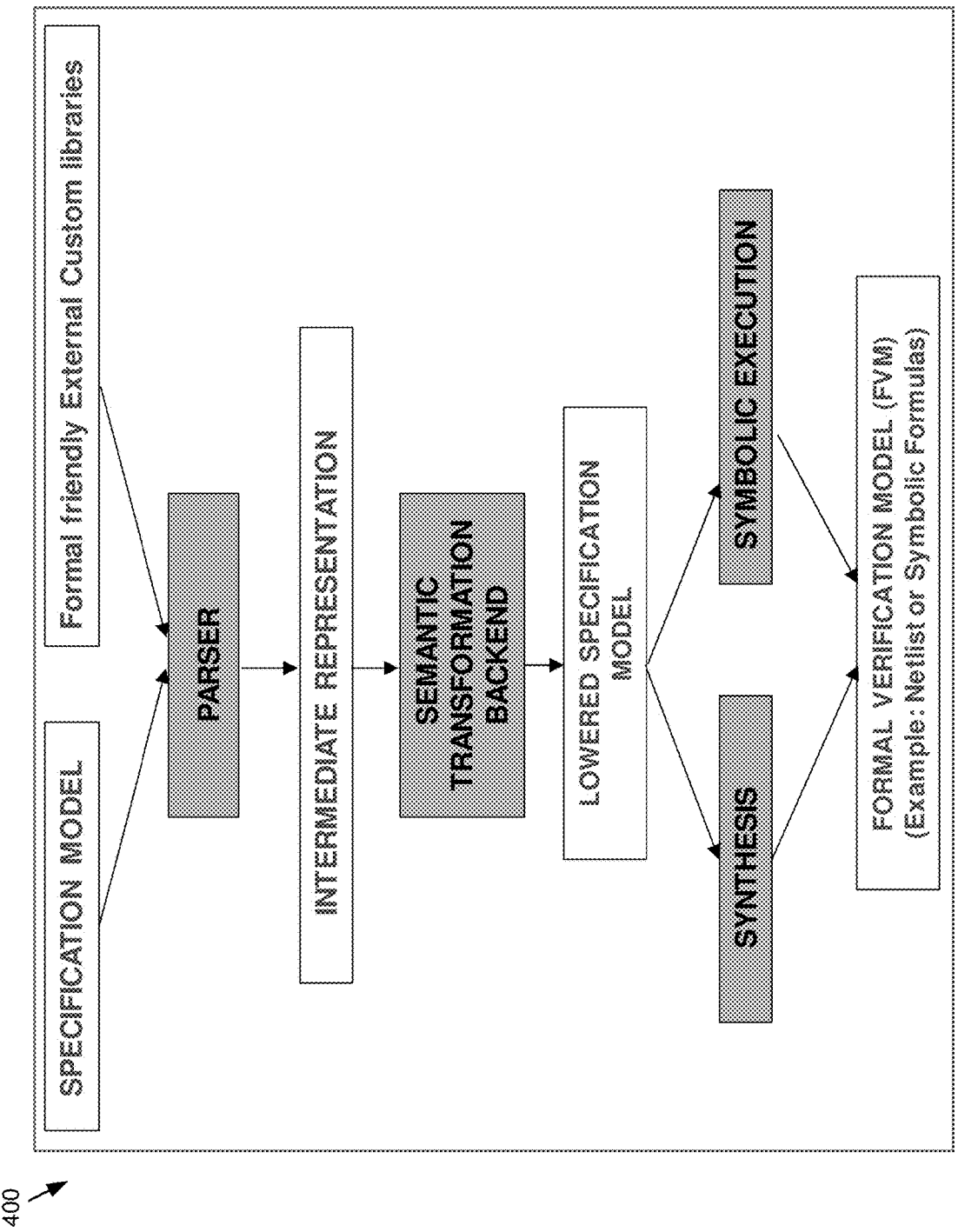
FIG. 4 is a flowchart depicting operations consistent with the verification process in accordance with an embodiment of the present disclosure.

Referring to FIG. 4, a flowchart depicting operations consistent with embodiments of verification process 10 is provided. FIG. 4 shows the generation of a formal verification model from a specification model. In operation, a specification model and one or more formal friendly external custom libraries may be provided to a parser. The parser may be configured to then generate an intermediate representation, which is supplied to a semantic transformation backend module to generate a semantically transformed or "lowered" specification model. Accordingly, given a software specification in C/C++/SystemC (in some cases along with pre-verified custom library implementations that mimic the functionality of the standard library calls in the original specification), the semantic transformation step first performs a sequence of semantic transformation passes to generate a lowered software specification in a procedural language that is logically equivalent to the original software specification. In some embodiments, the lowered specification model may be machine generated, and may be represented using fixed set of language constructs. The lowered specification model may include the lowered sources of both the specification model as well as custom libraries, hence it may operate as a standalone model. In some embodiments, synthesis technology may be configured to operate on the lowered specification model, hence it may be agnostic to advanced language features used in the original specification model. The generated lowered model may be synthesized using off-the-shelf synthesis engines or symbolic execution engines for generating a formal verification model. One of the advantages of this flow is that the synthesized formal verification model may be used not only for equivalence checking but also for assertion-based verification of the software specification.

In some embodiments, verification process 10 may include implementation aware synthesis. The synthesis process may be configurable in a way that it generates a structurally similar verification model from the software specification with respect to the implementation model. The process may utilize controlled pipelining, rewriting of data-path arithmetic and control-logic, and/or incorporating structurally similar arithmetic operators from pre-verified arithmetic libraries, etc.

In some embodiments, the semantic transformation operation may open up multiple avenues to generate the formal verification model ("FVM"). Some of which may include synthesis and symbolic execution. The FVM may be represented using any suitable approach, including, but not limited to, as a Netlist or symbolic formulas.

Figure 5:
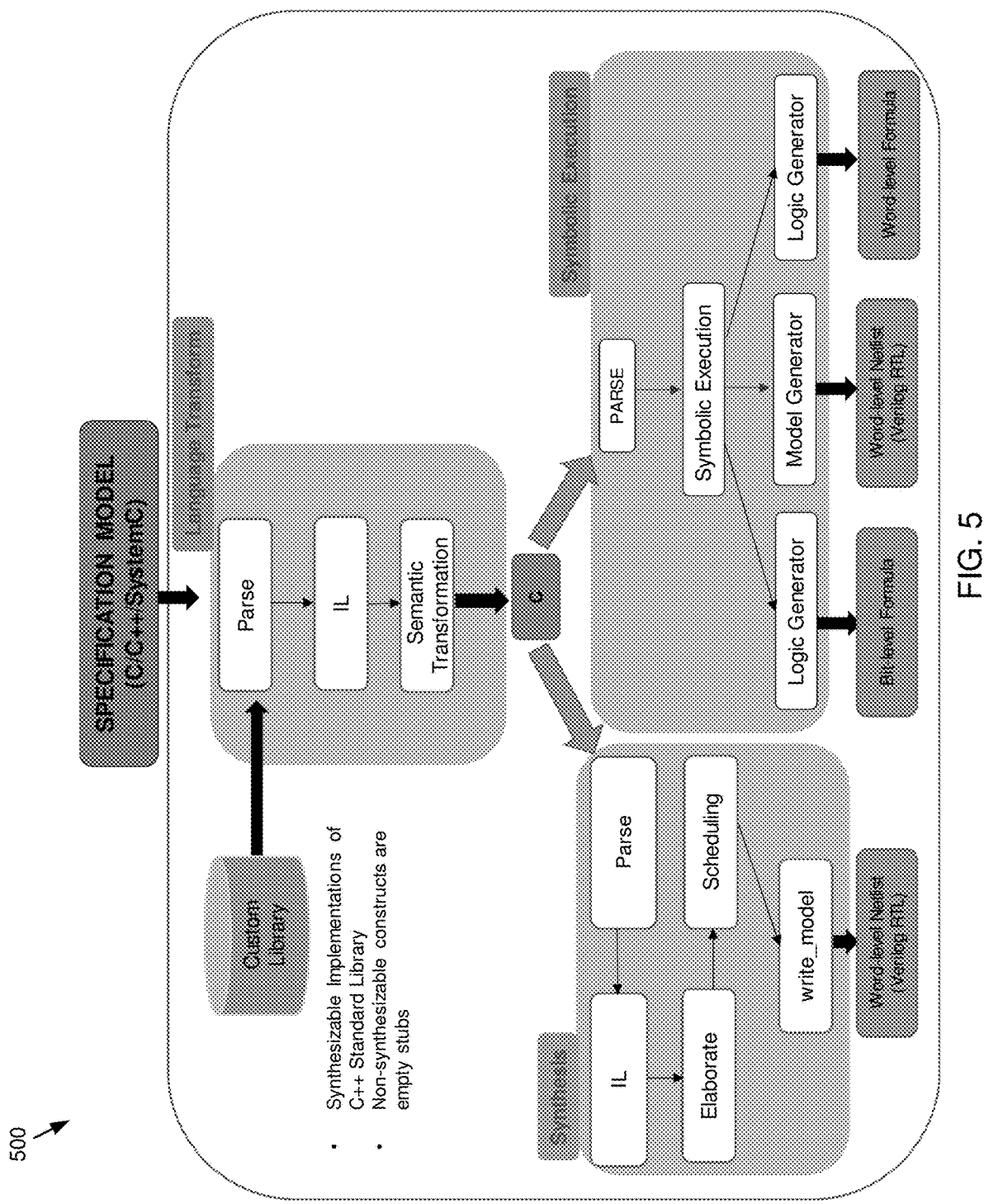
FIG. 5 is a diagram showing implementation details consistent with the verification process in accordance with an embodiment of the present disclosure.

Referring now to FIG. 5, a diagram showing an embodiment consistent with verification process 10 is provided. The various components of FIG. 5 are explained below.

Custom Library: The library is a set of C++ header files that contain synthesizable implementations of the C++ standard library. Non-synthesizable constructs are empty stubs.

Parse: Read C/C++/SystemC++ source program into IL

IL: Intermediate Language representation. This representation is the in-memory data structure that represents the source program.

Semantic Transformation: Transforms the IL into a lowered version of the source program. In this flow, the lowered version is a C-version of the source program.

Synthesis: High-level synthesis module to transform C/C++ program to an Register-Transfer-Level (RTL) representation.

Elaborate: Transform IL to RTL implementation and expand all instances of modules to unique objects.

Scheduling: Assign operations in RTL to specific clock cycle or state.

Write_model: Output RTL to an HDL (Hardware Description Language) file format. In this flow, the HDL format is Verilog netlist.

Word-level netlist: Netlist signals are represented as whole units rather than individual bits.

Symbolic execution: Use symbolic simulation to interpret the source program and generate a static single assignment (SSA) form of the input program Logic Generator: Translate symbolic expressions obtained from symbolic simulation to a bit-level formula or word-level formula.

Model Generator: Translate symbolic expression obtained from simulation to a word-level RTL netlist.

Bit-level Formula: A Boolean formula representation of the model where each variable is of 1-bit.

Word-level Formula: A formula representation of the model where each word is composed of one or more bits.

An example showing machine generated semantic preserving transformation from C++ to C is provided in FIG. 9.

In the example provided in FIG. 9, a <new> header file may be received from the Custom Library. It may be a synthesis-friendly header implementing the placement new( ) function. Special macros (here RTL_*) may be used to specify the top-level module ports in the generated RTL. Generated names preserve original C++ scope and type information. It should be noted that this example is simplified for clarity purposes.

Figure 10:
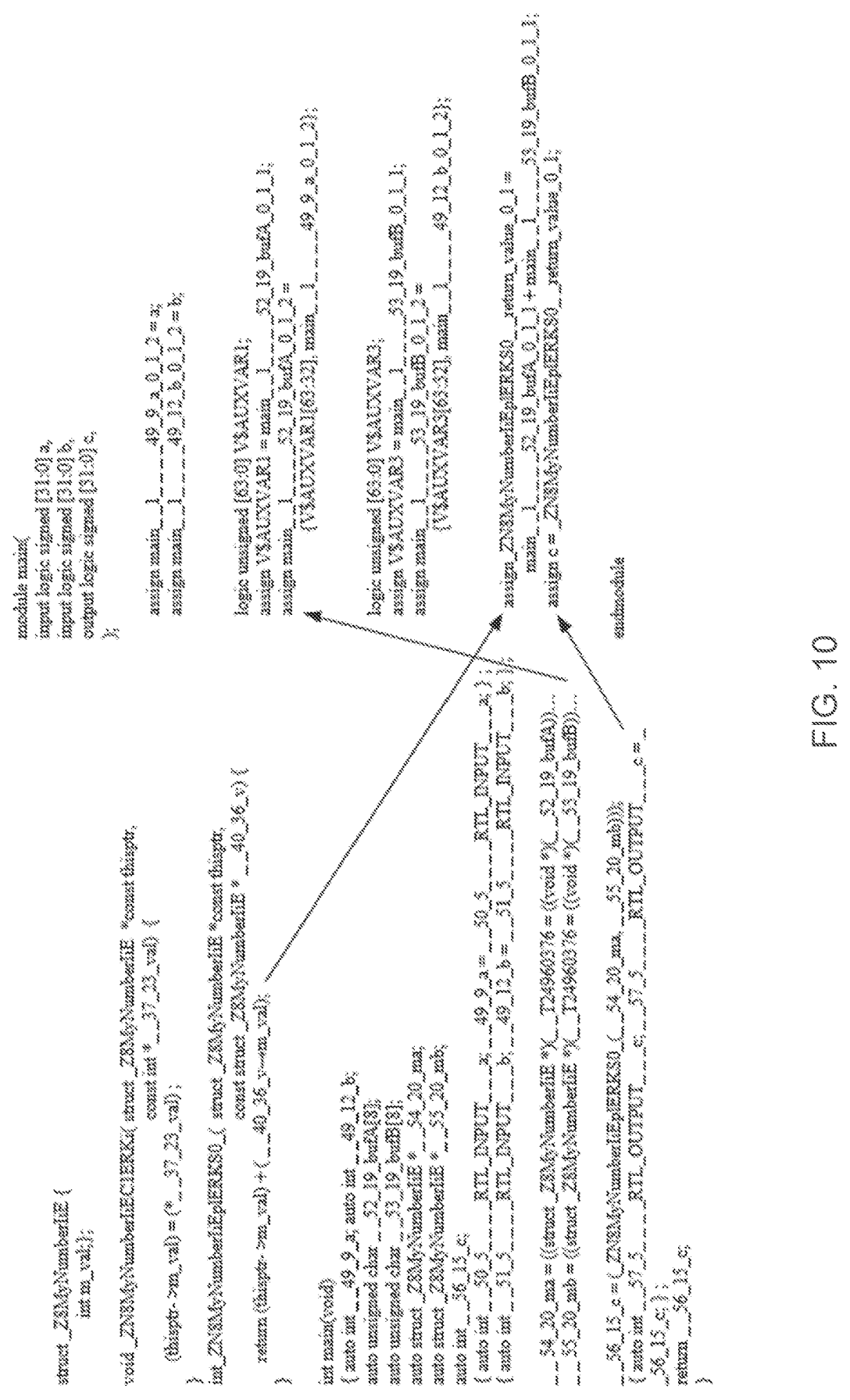

An example showing the synthesis of lowered C to RTL is provided in FIG. 10.

In the example provided in FIG. 10, the generated RTL may preserve C/C++ semantics. The function call to add operation is in-lined in the RTL. This is a combinational example. It should be noted that the generated RTL can be sequential as well. It should be noted that this example is simplified for clarity purposes.

Figure 6:
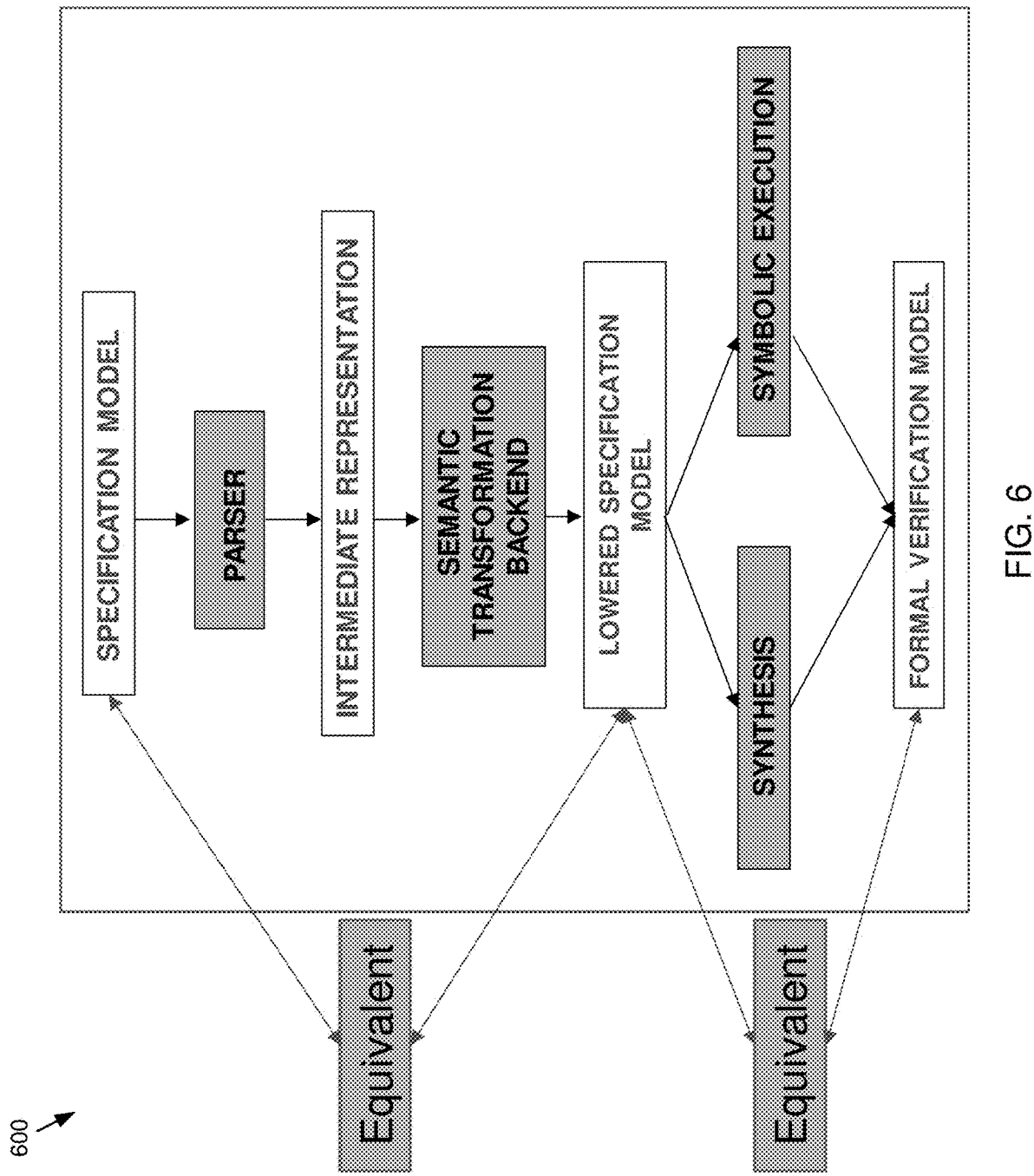
FIG. 6 is a flowchart depicting operations consistent with the verification process in accordance with an embodiment of the present disclosure.

Referring to FIG. 6, a flowchart depicting operations consistent with embodiments of verification process 10 is provided. FIG. 6 indicates the efficacy of verification process 10. As shown in the Figure, the lowered specification model may be functionally equivalent to the original specification model. This may be proven with any suitable software verifiers. In this example, the Formal Verification Model is functionally equivalent to the lowered specification model. This may also be proven with any suitable equivalence checker.

Figure 7:
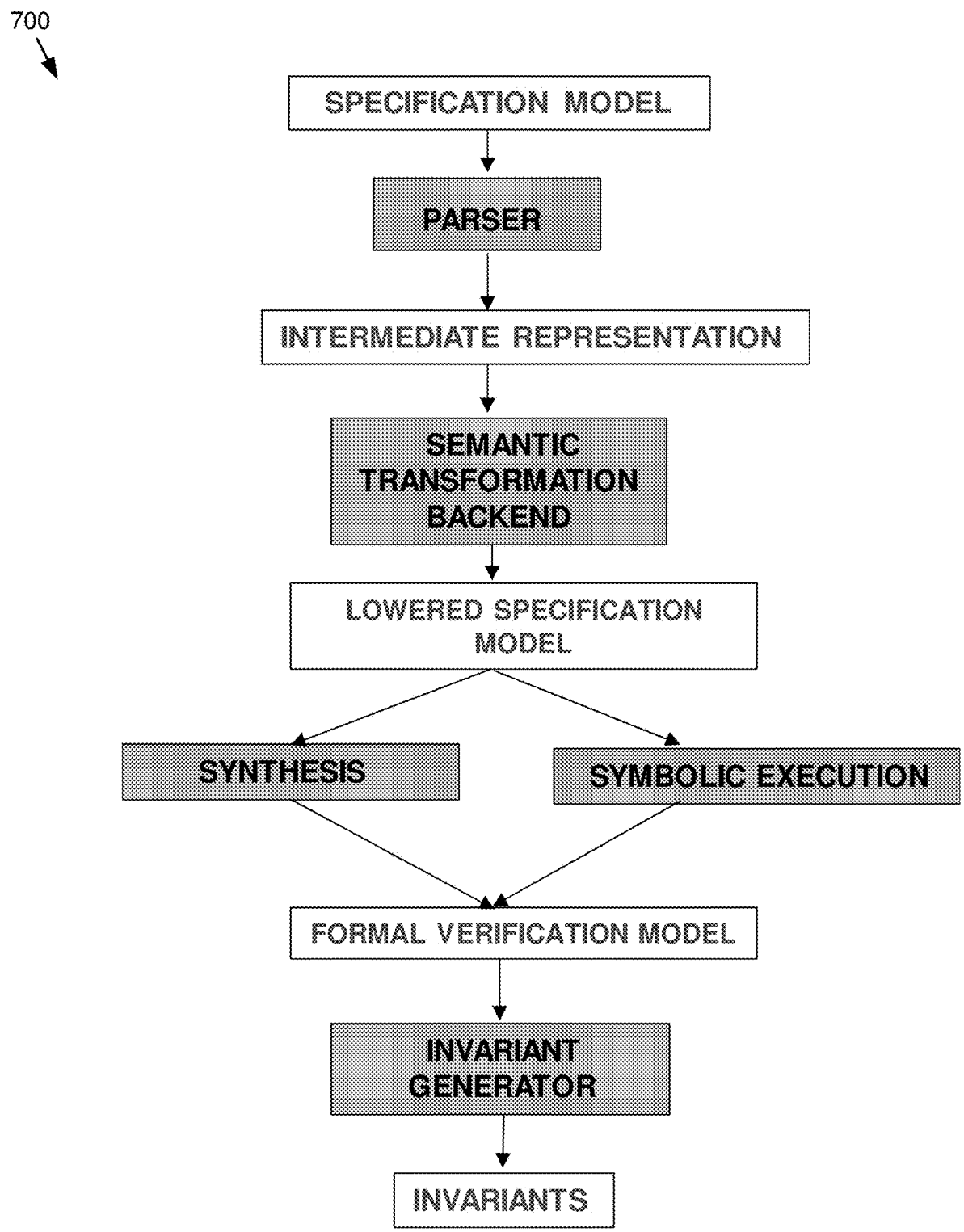
FIG. 7 is a flowchart depicting operations consistent with the verification process in accordance with an embodiment of the present disclosure.

Referring to FIG. 7, a flowchart depicting operations consistent with embodiments of verification process 10 is provided. FIG. 7 shows an example including invariant generation. Invariants are properties of a design that hold true in every execution of that design. Identifying good invariants is critical to the convergence of the equivalence checking proofs. However, invariant generation on structurally different designs is an extremely hard problem. The result of the semantic preserving transformation and configurable synthesis is an enabler for generating safety invariant properties on the miter logic containing the Cone of Influence (COI) of both specification and the implementation models. In some embodiments, safety invariant properties may be generated from the formal verification model using forward and backward analysis which aids in the verification process. It is worth noting that invariant generation from the original software specification is imprecise due to the absence of the actual source implementations of the standard library calls. However, the use of custom library implementation of these library calls helps to generate precise invariants using our technology.

Figure 8:
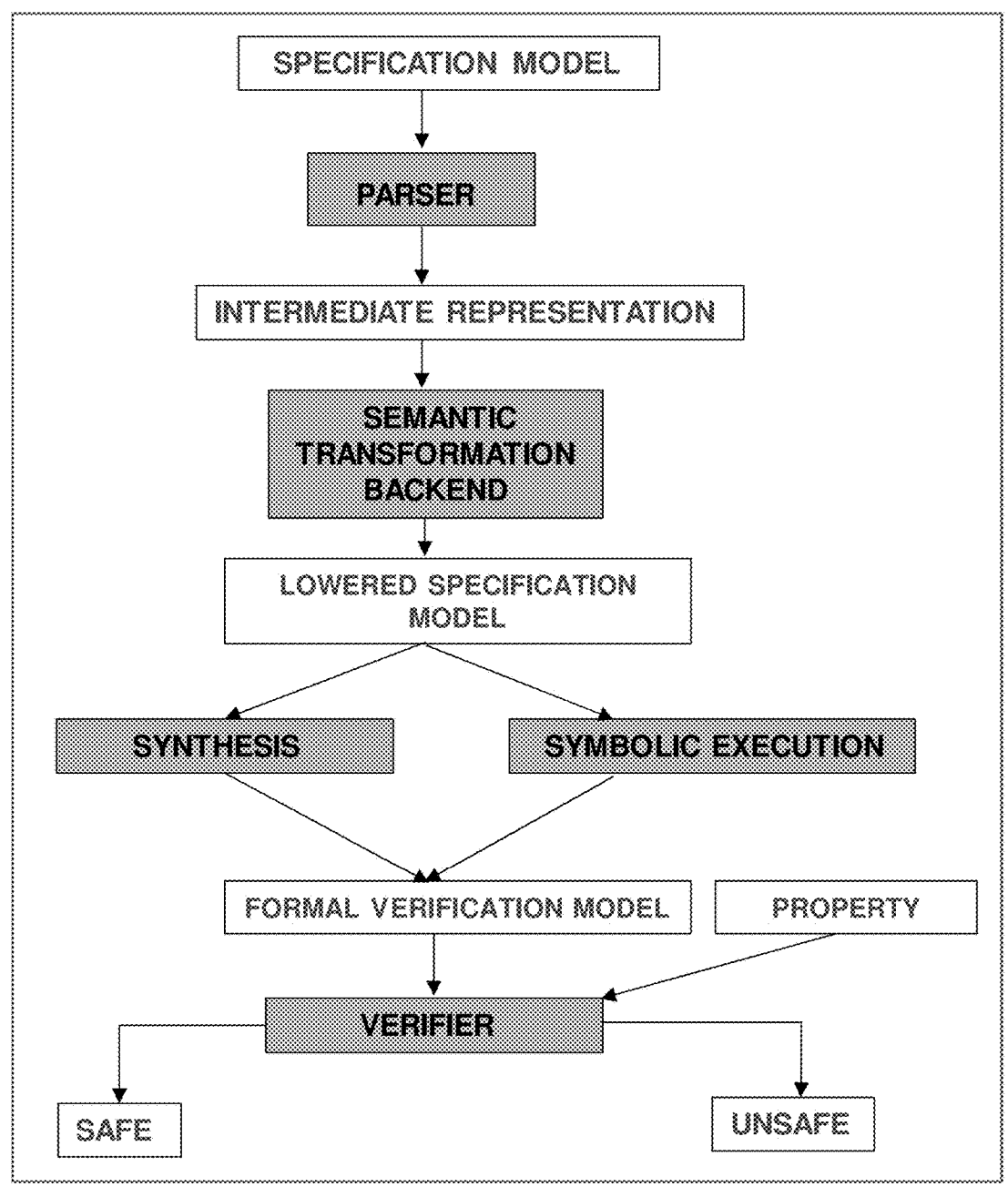
FIG. 8 is a flowchart depicting operations consistent with the verification process in accordance with an embodiment of the present disclosure.

Referring to FIG. 8, a flowchart depicting operations consistent with embodiments of verification process 10 is provided. FIG. 8 shows an example with a verifier that may be configured to receive both the FVM and the property. Here, property verification of a stand-alone specification model is shown.

Accordingly, the teachings of the present disclosure may be configured to solve the language coverage problem by using a semantic transformation-based synthesis solution. Given any software specification in C/C++/SystemC, the semantic transformation technology essentially produces a synthesizable lowered specification model that may be represented using a fixed set of language constructs. In this way, the synthesis technology in the post-lowering stage always works on a design given in a simplified and restricted language set. This ensures that verification process 10 may be easily used for any software specification that use advanced language features as well as for designs that evolve over time.

In some embodiments, the verification model may be targeted both for equivalence checking as well as assertion-based verification. The verification model corresponding to the software specification may be modeled with its own environmental assumptions and assertions, which may then be fed to any state-of-the-art verification tools for assertion checking in standalone manner.

Embodiments of the present disclosure differ from conventional technologies in a number of ways. Verification process 10 may be configured to generate a formal verification model from software specification for equivalence checking against an implementation model using semantic transformation-based synthesis technology for improved language coverage. The use of a semantic transformation-based solution enhances the scope of our equivalence checking technology for continuously evolving designs that make use of frequent language enhancements.

Embodiments of the present disclosure may enable the integration of both high-level synthesis technology as well as symbolic execution technology for generating a formal verification model from a given software specification, into an equivalence checking solution. Software specifications are generally a moving target due to frequent language enhancements and iterative refinements. The present disclosure is agnostic to the front-end language enhancements, since the lowered model may always be expressed using a fixed set of instructions, thereby broadening the scope of the usability of our equivalence checking solution. The semantic transformation-based synthesis flow supports greater language coverage compared to existing solutions, which enables synthesizing specification models written using advanced language features. The synthesized formal verification model may be used for different use cases, namely, equivalence checking, as well as assertion-based verification.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in a formal verification of an electronic design comprising:
    receiving, using a processor, a specification model associated with an electronic design;
    generating, using a parser, an intermediate representation based upon, at least in part, the specification model;
    applying a machine generated semantic preserving program transformation to the intermediate representation to create a semantically transformed specification model; and
    synthesizing the semantically transformed specification model to generate a formal verification model.

2. The computer-implemented method of claim 1, further comprising:
    applying symbolic execution to the semantically transformed specification model to generate the formal verification model.

3. The computer-implemented method of claim 1, wherein generating the intermediate representation is based upon, at least in part, one or more external custom libraries.

4. The computer-implemented method of claim 1, further comprising:
    providing the formal verification model and a property to a verifier.

5. The computer-implemented method of claim 1, further comprising:
    providing the formal verification model to an invariant generator.

6. The computer-implemented method of claim 5, further comprising:
    generating one or more invariants at the invariant generator.

7. The computer-implemented method of claim 1, wherein the semantically transformed specification model is functionally equivalent to the formal verification model.

8. A computer-readable storage medium for electronic design verification, the computer-readable storage medium having stored thereon instructions that when executed by a machine result in one or more operations, the operations comprising:
    receiving, using a processor, a specification model associated with an electronic design;
    generating, using a parser, an intermediate representation based upon, at least in part, the specification model;
    applying a machine generated transformation to the intermediate representation to create a semantically transformed specification model that is in a procedural language that is logically equivalent to the specification model;
    synthesizing the semantically transformed specification model to generate a formal verification model; and
    utilizing the formal verification model for at least one of equivalence checking or assertion-based verification of the specification model.

9. The computer-readable storage medium of claim 8, further comprising:
    applying symbolic execution to the semantically transformed specification model to generate the formal verification model.

10. The computer-readable storage medium of claim 8, wherein generating the intermediate representation is based upon, at least in part, one or more external custom libraries.

11. The computer-readable storage medium of claim 8, further comprising:
    providing the formal verification model and a property to a verifier.

12. The computer-readable storage medium of claim 8, further comprising:
    providing the formal verification model to an invariant generator.

13. The computer-readable storage medium of claim 12, further comprising:
    generating one or more invariants at the invariant generator.

14. The computer-readable storage medium of claim 8, wherein the semantically transformed specification model is functionally equivalent to the formal verification model.

15. A system for use in a formal verification of an electronic design comprising:
    a computing device having at least one processor configured to receive a specification model associated with an electronic design and one or more custom libraries, the at least one processor further configured to generate, using a parser, an intermediate representation based upon, at least in part, the specification model, the at least one processor further configured to apply a machine generated semantic preserving program transformation to the intermediate representation to create a semantically transformed specification model that is in a procedural language that is logically equivalent to the specification model, the at least one processor further configured to synthesize and perform symbolic execution on the semantically transformed specification model to generate a formal verification model.

16. The system of claim 15, wherein the at least one processor is further configured to apply symbolic execution to the semantically transformed specification model to generate the formal verification model.

17. The system of claim 15, wherein generating the intermediate representation is based upon, at least in part, one or more external custom libraries.

18. The system of claim 15, wherein the at least one processor is further configured to provide the formal verification model and a property to a verifier.

19. The system of claim 15, wherein the at least one processor is further configured to provide the formal verification model to an invariant generator.

20. The system of claim 19, wherein the at least one processor is further configured to generate one or more invariants at the invariant generator.

* * * * *